US006240211B1

(12) United States Patent
Mancuso et al.

(10) Patent No.: US 6,240,211 B1
(45) Date of Patent: May 29, 2001

(54) METHOD FOR MOTION ESTIMATED AND COMPENSATED FIELD RATE UP-CONVERSION (FRU) FOR VIDEO APPLICATIONS AND DEVICE FOR ACTUATING SUCH METHOD

(75) Inventors: Massimo Mancuso, Monza; Viviana D'Alto; Rinaldo Poluzzi, both of Milan; Luca Molinari, Piacenza, all of (IT)

(73) Assignee: SGS-Thomson Microelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/059,879

(22) Filed: Apr. 14, 1998

(30) Foreign Application Priority Data

Apr. 24, 1997 (EP) ........................................ 97830188

(51) Int. Cl.[7] .............................................. G06K 9/36
(52) U.S. Cl. ................................................ 382/236
(58) Field of Search ............................ 382/232, 236, 382/238, 239

(56) References Cited

U.S. PATENT DOCUMENTS 5,825,424 * 10/1998 Canfield et al. .................... 348/416
5,901,248 * 10/1998 Fandrianto et al. ................ 382/236
5,988,848 * 11/1999 Berstecher et al. ................ 364/148
5,995,080 * 11/1999 Biro et al. ........................ 345/154

* cited by examiner

*Primary Examiner*—Joseph Mancuso
*Assistant Examiner*—Ali Bayat

(74) *Attorney, Agent, or Firm*—Wolf, Greenfield & Sacks, P.C.; James H. Morris; Theodore E. Galanthay

(57) ABSTRACT

A method and a device for motion estimated and compensated Field Rate Up-conversion (FRU) for video applications is disclosed and claimed. The invention provides for dividing an image field to be interpolated into a plurality of image blocks, where each image block includes a respective set of image elements of the image field. In one embodiment, for each image block of a subset of image blocks, a group of neighboring image blocks is selected. A motion vector for the image block is estimated that describes the movement of the image block from a previous image field to a current image field on the basis of predictor motion vectors associated to the group of neighboring image blocks. Each image element of the image block is determined by interpolation of two corresponding image elements in the previous and current image fields related by the estimated motion vector. To estimate a motion vector, the invention provides for applying each of the predictor motion vectors to the image block to determine a respective pair of corresponding image blocks in the previous and current image fields. For each of the pairs of corresponding image blocks, an error function which is the Sum of luminance Absolute Difference (SAD) between corresponding image elements in the pair of corresponding image blocks is evaluated. For each pair of the predictor motion vectors, a degree of homogeneity is also evaluated, followed by the application of a fuzzy rule having an activation level that is proportional to the degree of homogeneity of the pair of predictor motion vectors and the error functions of the pair of predictor motion vectors. An optimum fuzzy rule having the highest activation level is selected, from which the best predictor motion vector is determined, having the smaller error function of the pair associated to the optimum fuzzy rule. In most cases, the motion vector for the image block is estimated on the basis of the best predictor motion vector.

27 Claims, 14 Drawing Sheets

0.5

| | Px1 | |
|---|---|---|
| | Px3 | |
| | Px2 | |

Previous field block

| | Px5 | |
|---|---|---|
| | Px6 | |
| | Px4 | |
| | | |

Current field block

Available pixels

Pixels to be interpolated

| NB[0] (P[0]) | | NB[1] (P[1]) |
|---|---|---|
| | K(x,y) | |
| NB[2] (P[2]) | | NB[3] (P[3]) |

Vectors computed

Vectors to be interpolated

METHOD FOR MOTION ESTIMATED AND COMPENSATED FIELD RATE UP-CONVERSION (FRU) FOR VIDEO APPLICATIONS AND DEVICE FOR ACTUATING SUCH METHOD

BACKGROUND OF THE INVENTION

1. Field of the Invention

The present invention relates to a method for motion estimated and compensated Field Rate Up-conversion (FRU) for video applications, and to a device for actuating such method More particularly, the invention relates to a method based on a so-called "block-matching technique".

2. Discussion of the Related Art

The market introduction of high-end TV sets, based on 100 Hz Cathodic Ray Tubes (CRTs), required the development of reliable Field Rate Up-conversion (FRU) techniques to remove artifacts such as large area flicker and line flicker.

Methods for FRU are known (hereafter referred to as "standard FRU methods") that add interpolated missing image fields to a video source. The standard methods interpolate the missing fields to be displayed on the CRT without performing an estimation and compensation of motion of moving objects in successive image fields of the video source.

The standard FRU methods are satisfactory for improving the quality of an image and reducing artifacts such as large-area flicker or line flicker in the up-converted output. However, when FRU is performed by means of the standard methods, new artifacts can appear in the displayed image. In particular, if the image contains moving objects, "motion judder" is introduced. In fact, the standard interpolation algorithms are not able to detect an objects' motion, and this can lead to interpolated fields in which the moving objects are displayed in wrong positions.

The problem is better understood by referring to FIG. 1, in which the motion trajectory of a moving object (white squares) in the original video source image fields is supposed to be a straight line. If the missing fields are interpolated by means of a standard FRU method (i.e. without motion estimation and compensation), the position of the moving object in the interpolated fields (dark gray squares) is not as expected by a viewer (dotted squares). Such artifacts are visible to the viewer, inducing a blurring effect for fast moving objects and considerably reducing the quality of the displayed images.

In order to avoid such a blurring effect and to reduce artifacts in general, other FRU methods have been proposed that are capable of performing a motion estimation and compensation of moving objects in the image fields. Essentially, motion estimation and compensation provides for detecting the moving parts of the video source image fields and interpolating the missing fields for up-conversion according to the estimated motion. The movement of objects in consecutive image fields can be represented by so-called "motion vectors".

FIG. 2 shows an example of a known FRU method with motion estimation and compensation, where an image containing moving objects is considered. Between two consecutive source image fields, a moving object may have changed its position; for example, object MO in a previous field (Field T) is in position A and in a current field (Field T+1) is in position B. A motion exists from the previous field to the current field, and this motion can be represented by a vector AB, called a motion vector.

The motion vector AB represents the motion of object MO from position A in the previous field to position B in the current field: starting from position A in the previous field and applying the motion vector AB to object MO, the object MO is translated into position B in the current field. The position I of the object MO in the intermediate missing field to be interpolated (Field T+½) must be calculated by the interpolation of the previous field and the current field, taking into account the respective positions A and B of the moving object MO. For example, if object MO changes position between the previous field and the current field, position I in the missing field is obtained by the translation of A with a motion vector |AB|/2. In this way, it is possible to avoid the blurring effect because the missing field is interpolated with the moving object in an appropriate position.

Theoretically, a motion vector could be calculated for each pixel of a field. However, this would require a large number of calculations and substantial memory. In practice, it is assumed that the dimensions of the objects in the source image are always larger than that of a pixel. The image field is therefore divided into image blocks IB (FIG. 3) and a motion vector for each block is calculated. The dimension of the image blocks in terms of pixels is generally chosen on an experimental basis. The position of an image block in a field is identified by the coordinates of the first pixel (upper-left) of the block in the field. Typically, it is also assumed that the movement of each image block is rigid and translational only.

Known methods that include motion estimation generally provide for detecting corresponding image blocks in two consecutive source image fields and interpolating the missing fields according to the relative positions of the blocks. As shown in FIG. 4, a matrix MV (Motion Vectors) is associated with a pattern of image blocks in a missing field. This matrix MV includes a motion vector for each image block of the pattern. Each block K(x,y) of the missing field has a position x, y, where x and y are the coordinates of the upper-left pixel of the block. The position of the block in the missing field is between the position of a corresponding block B1 in the previous source image field and a corresponding block B2 in the current source image field.

Blocks B1 and B2 are related by the motion vector V in matrix MV. For a generic block K(x,y) in the missing field, the corresponding vector in matrix MV is a vector V(dx,dy). From the position of the motion vector in the matrix MV and the value of the motion vector, the positions of the blocks B1 and B2 in the previous and current fields, respectively, are given by:

$$B1(x-dx;y-dy) \text{ and } B2(x+dx;y+dy) \quad (1).$$

Thus, once the matrix MV of motion vectors has been built, the motion of each block between consecutive source image fields is determined, and the missing fields can be interpolated with the blocks in correct positions.

To build up the matrix MV of motion vectors, the image blocks of a missing field are scanned starting from the upper-left down to the bottom-right. According to a so-called "block-matching" technique, for each image block some neighboring blocks are selected, together with their respective motion vectors. For those neighboring blocks that precede the block under examination in the scanning sequence for the missing field, the previously calculated motion vectors for the preceding blocks are used; for those neighboring blocks following the block under consideration in the scanning sequence, for which new motion vectors have not yet been calculated, the motion vectors of a previously calculated and stored matrix MV are used. The motion vector associated with the block under consideration is then calculated on the basis of the motion vectors of the neighboring blocks.

Such a method involves a recursive algorithm, and the performance of the method, as well as the results of the displayed image, depend on the choice of the neighboring blocks and on the way in which the motion vector for a particular block is calculated from the motion vectors of the neighboring blocks.

In view of the state of the art, it is an object of the present invention to provide an improved method for motion estimated and compensated FRU.

SUMMARY OF THE INVENTION

According to the present invention, these and other objects are achieved by a method and apparatus for motion estimated and compensated field rate up-conversion. The invention provides for dividing an image field to be interpolated into a plurality of image blocks, where each image block is made up of a respective set of image elements of the image field.

In one embodiment, for each image block of a subset of image blocks, a group of neighboring image blocks is selected. A motion vector for the image block is estimated that describes the movement of the image block from a previous image field to a current image field, on the basis of predictor motion vectors associated to the group of neighboring image blocks. Each image element of the image block is determined by interpolation of two corresponding image elements in the previous and current image fields related by the estimated motion vector.

To estimate a motion vector, the invention provides for applying each of the predictor motion vectors to the image block to determine a pair of corresponding image blocks in the previous and current image fields. For each of the pairs of corresponding image blocks, an error function which is the Sum of luminance Absolute Difference (SAD) between corresponding image elements in the pair of corresponding image blocks is evaluated. For each pair of the predictor motion vectors, a degree of homogeneity is also evaluated, followed by the application of a fuzzy rule having an activation level that is proportional to the degree of homogeneity of the pair of predictor motion vectors and the error functions of the pair of predictor motion vectors. An optimum fuzzy rule having the highest activation level is selected, from which the best predictor motion vector is determined, having the smaller error function of the pair associated to the optimum fuzzy rule. In most cases, the motion vector for the image block is estimated on the basis of the best predictor motion vector.

Also according to the present invention, a device suitable for performing such a method is provided, including image element storage means for storing image elements of the previous and current image fields and for creating a search area in the previous and current image fields, addressing means for addressing selected image elements in the storage means, and motion vector storage means for storing the estimated motion vectors. The device further includes first computation means supplied by the storage means for evaluating the error functions associated to the predictor motion vectors, a fuzzy computation unit supplied by the first computation means and the motion vector storage means for determining the best predictor motion vector by applying the fuzzy rule to each pair of predictor motion vectors and to the values of the associated error functions, and interpolation means supplied by the storage means for determining each image element of the image block by interpolation of two corresponding image elements in the previous and current image fields related by the estimated motion vector.

BRIEF DESCRIPTION OF THE DRAWINGS

Several features and advantages of the present invention will be made apparent by the following detailed description of a particular embodiment, illustrated by way of non-limiting example in the accompanying drawings, wherein.

DETAILED DESCRIPTION

Figure 1:
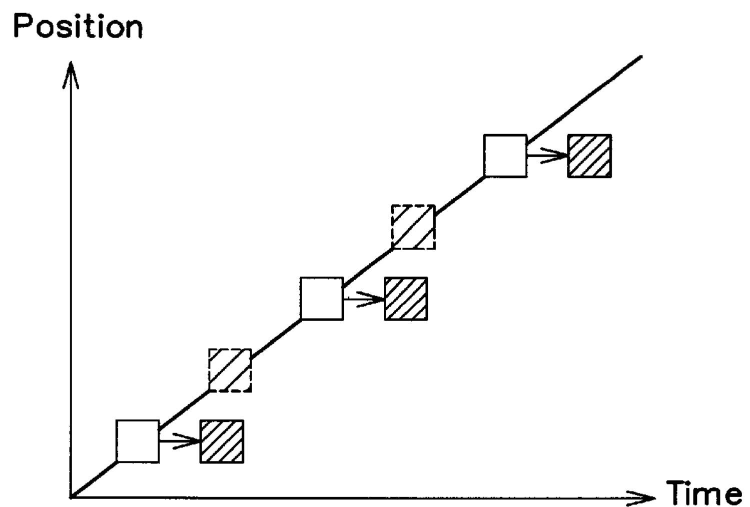
FIG. 1 schematically shows the results of a standard (non motion compensated) FRU method.
Figure 2:
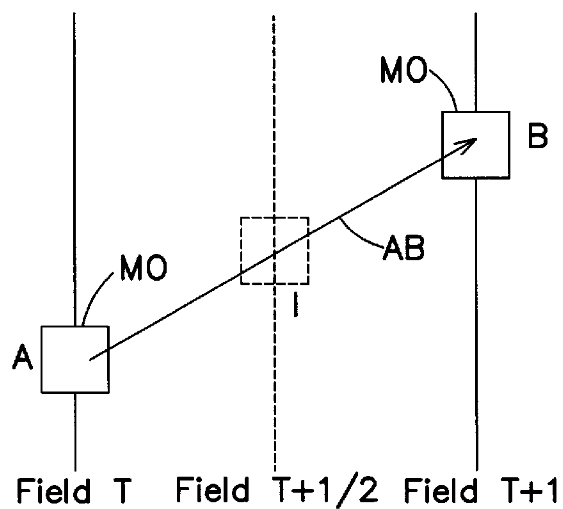
FIG. 2 schematically shows the change of position of a moving object between two consecutive source image fields.
Figure 3:
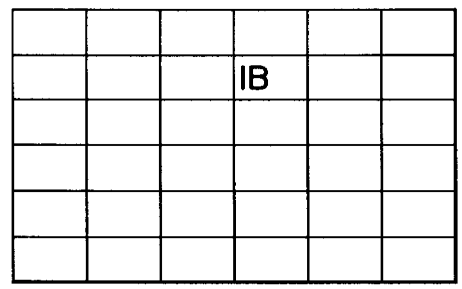
FIG. 3 schematically shows an image field divided in a pattern of image blocks.
Figure 4:
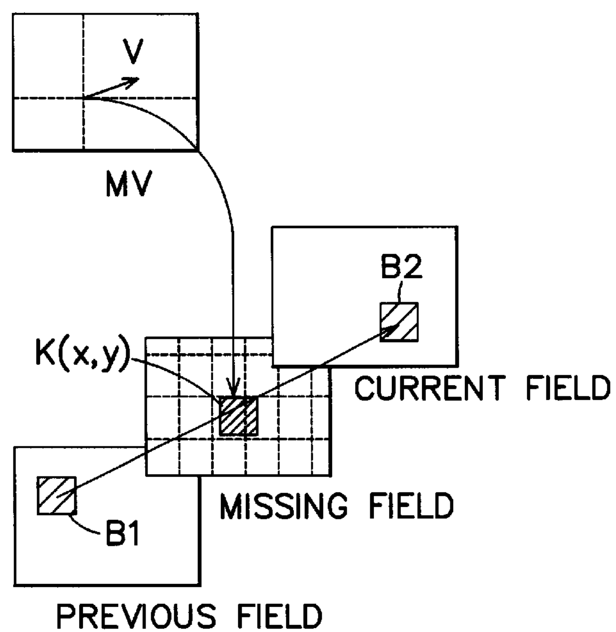
FIG. 4 schematically shows the operation of a known motion estimated and compensated FRU method.

As described in connection with FIG. 3, in order to reduce the number of calculations performed for motion estimated and compensated field rate up-conversion, each image field is divided into image blocks IB of equal dimension. The dimension of each block IB is determined on an experimental basis; for example, a suitable block dimension may be 8×8 pixels of the image frame (containing both the odd lines and the even lines), i.e. 4×8 pixels of the image field (containing either the odd or the even lines). With these dimensions, the number of blocks per image field is (288/4)×(720/8)=72×90 blocks, where 288 is the number of lines and 720 is the number of columns of a field for standard interlaced scanning.

Figures 5, 6:
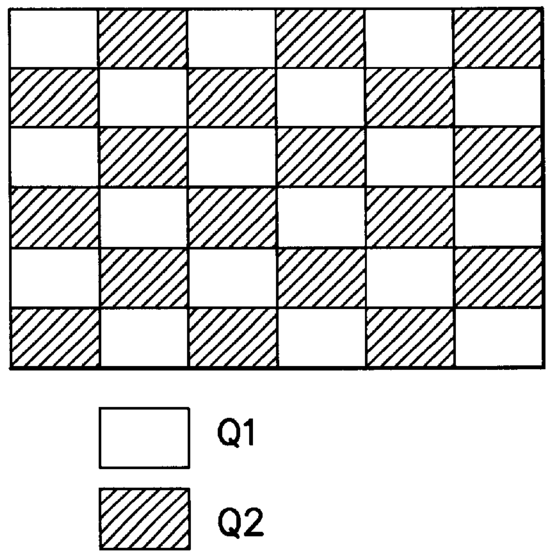
FIG. 5 schematically shows two quincunx patterns of image blocks in an image field.
FIG. 6 schematically shows an image block for which a motion vector is to be evaluated, and a pattern of neighboring blocks used to perform the method of the invention.

In a preferred embodiment of the present invention, instead of estimating motion vectors for all of the blocks of the image field, only those motion vectors associated with the image blocks belonging to either one or the other of two so-called "quincunx sub-sampling patterns", Q1 and Q2 shown in FIG. 5, are estimated. This further reduces the number of calculations and the required memory resources. In an alternative embodiment, motion vectors may be estimated for each image block of the missing image field. A method for estimating a motion vector associated with a generic image block is described first below.

As shown in FIG. 6, each generic block K(x,y) belongs to one of two quincunx patterns. In the method for estimating a motion vector for this generic block, four neighboring blocks NB[0]–NB[3] are selected, together with their associated motion vectors P[0]–P[3] ("predictor motion vectors"). Experimentally, it has been verified that the best choice of neighboring blocks include the adjacent blocks in the two diagonal directions; this choice is also compatible with quincunx sub-sampling of the blocks in the image field, as described later.

For the two blocks NB[0] and NB[1] preceding block K(x,y) in the image block scanning sequence, the values of predictor motion vectors P[0] and P[1] have already been calculated and are available in the current motion vector matrix. For the blocks NB[2] and NB[3] following block K(x,y), the values of predictor motion vectors P[2] and P[3] are extracted from a previous motion vector matrix that has been previously calculated and stored. Each one of the four predictor motion vectors P[0]–P[3] is then applied to block K(x,y); for each motion vector P[0]–P[3], two corresponding blocks, one in the current source field and the other in the previous source field, are determined according to equation (1) above, resulting in four pairs of blocks.

For each pair of corresponding blocks obtained in the previous and current source fields, an error function err[i] is calculated to determine which one of the motion vectors P[i] (i∈ [0;3]) indicates the most accurate motion of the block K(x,y) under examination. The error function err[i] is the Sum of the luminance Absolute Difference (SAD), pixel to pixel, between the two corresponding blocks in the previous and current source fields, given by $$err[i]=SAD(X,Y,P[i])=$$

$$=\Sigma|lum(X+x,Y+y,t-1)-lum(X+dx+x,Y+dy+y,t)|$$

$$x\in[0;7]$$

$$y\in[0;7]$$

where X and Y are the coordinates of the upper-left pixel of the block found in the previous field, lum ($\underline{x},\underline{y}$,t) is the luminance of the pixel at position ($\underline{x},\underline{y}$) in the current or previous field (for t or t−1, respectively), and P[i] is the motion vector having coordinates (dx, dy). In this way, four error values err[i] are obtained, one for each predictor motion vector P[i]. The components of a generic predictor motion vector P[i] along the coordinate axes x and y are called P[i]x and P[i]y, respectively.

Since each source image field contains either the odd or the even lines of an image frame (interlaced transmission standard), the corresponding blocks in the previous and current source fields do not contain all the image lines. For example, if the previous field is an odd field and the current field is an even field, the image block in the previous field contains only the odd lines, while the corresponding image block in the current field contains only the even lines. To compute the error function err[i] for any value of the motion vector, it is necessary to have both the odd and the even lines present in corresponding blocks of the previous and current source fields.

The method of the present invention therefore interpolates the missing lines of the image blocks, necessary for the computation of the error functions err[i], depending on the parity (odd or even) of the first line of each block. If the y-component of the predictor motion vector for a particular pair of image blocks is even, then the first pixel of a block in the previous source field and the first pixel of the corresponding block in the current source field will belong to image lines with the same line parity (both odd or both even). If, however, the y-component of the predictor motion vector for the particular pair of blocks is odd, then the first lines of corresponding blocks in the current and previous source field will have different parities (one odd, one even).

Figure 7:
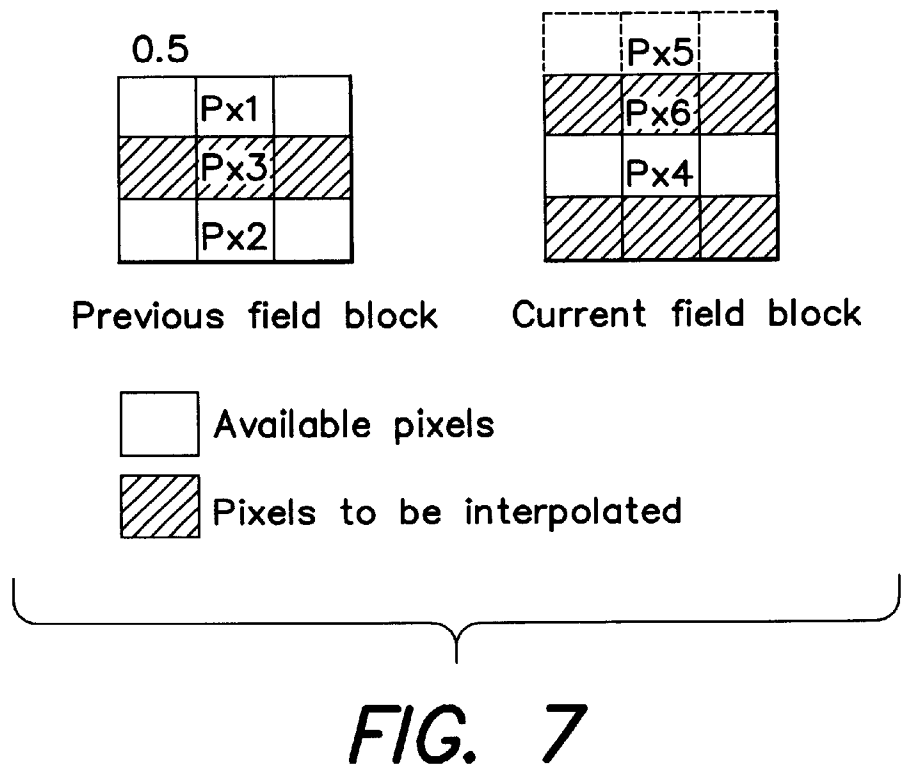
FIG. 7 schematically shows portions of two corresponding image blocks in a previous and current source image field.

FIG. 7 shows an example of line interpolation for one possible situation, where the first lines of each source field is the same parity. For each of the corresponding image blocks of the previous and current source fields, it is necessary to interpolate one line over two. To perform the interpolation, a median filter that calculates the mean value of its inputs is used. For example, in the previous field block of FIG. 7, the pixel PX3 belonging to the missing line is given by Px3=MED(Px1,Px2,Px4). When the pixel to be interpolated is in the first or the last line of the block, for example, as shown by the pixel Px6 in the current field block of FIG. 7, a pixel from a prior line can be used (if it is possible, otherwise it is possible to use line repetition) for the interpolation. The pixel PX6 may then be given by Px6=MED(Px4,Px5,Px1).

It should be noted that this interpolation depends on the predictor motion vector associated with the image block pair; in fact, the value of the missing pixel Px3 of the block in the previous source field is interpolated using the value of the available pixel Px4 of the corresponding block in the current source field, obtained by applying the predictor motion vector P[i]. In this way the quality of the interpolation is greatly improved.

In summary, for each predictor motion vector P[i], two corresponding blocks in the previous and current source fields are determined, the missing lines of each of the two corresponding blocks are interpolated, and then a corresponding error function err[i] is evaluated.

To see which one of the four predictor motion vectors P[i] best fits the motion of block K(x,y) between the previous and the current source field, both the value of the error functions err[i] and a "degree of homogeneity" between each pair of different predictor motion vectors P[i] and P[j] (i,j ∈ [0;3] and i≠j), is analyzed. To accomplish this, according to the invention a fuzzy computation is performed applying the following fuzzy rule to each pair of predictor motion vectors P[i] and P[j]:

"If the vectors P[i] and P[j] are homogeneous and err[i] is small and err[j] is small then this function is high".

Six different pairs of predictor motion vectors exist, so a total of six fuzzy rules are evaluated.

Figure 8:
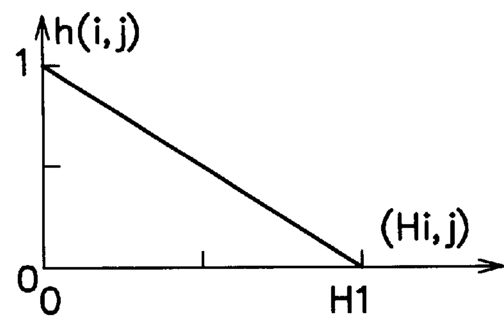
FIGS. 8 to 11 depict membership functions used to perform a fuzzy calculation.

To test the degree of homogeneity between two different predictor motion vectors, a homogeneity value H(i,j) is first computed, given by H(i,j)=|P[i]x−P[j]x|+|P[i]y−P[j]y|. Then, a membership function, such as the one depicted in FIG. 8, is applied to the homogeneity value H(i,j) to obtain a fuzzy variable h(i,j) whose value indicates the degree of membership of the value of H(i,j) to the fuzzy set "homogeneous". In FIG. 8, H1 can be a value preferably between 7 and 14.

Figure 9:
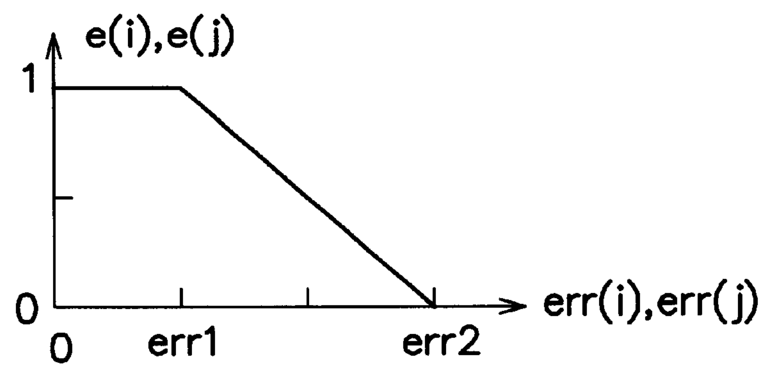

Similarly, a membership function such as the one depicted in FIG. 9 is applied to the value of the error functions err[i] and err[j] to obtain fuzzy variables e(i) and e(j), respectively, whose value is indicative of the degree of membership of the values of err[i] and err[j] to the fuzzy set "small". In FIG. 9, err1 is a value preferably between 40 and 70, and err2 is a value preferably between 180 and 200.

Each one of the six fuzzy rules provides a value (activation level of the fuzzy rule) r[k] ($k \in [0;5]$), given by r[k]=min(h(i,j),e(i),e(j)).

Additionally, a further (seventh) fuzzy rule is evaluated:

"If all the err[i] values are high and P[0] plus P[1] are high, then this function is high". First the following values are computed:

$$UP(x)=|P[0]x+P[1]x|;\ UP(y)=P[0]y+P[1]y|.$$

Figure 10:
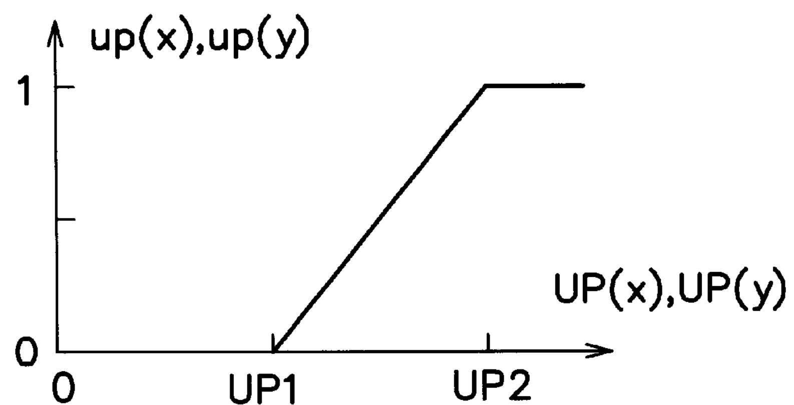

Then, a membership function such as the one depicted in FIG. 10 is applied to each of the values of UP(x) and UP(y) to obtain two fuzzy variables up(x) and up(y) indicative of the degree of membership of values UP(x) and UP(y) to a first fuzzy set "high". In FIG. 10, UP1 is a value preferably between 4 and 9, and UP2 is a value preferably between 12 and 20.

Figure 11:
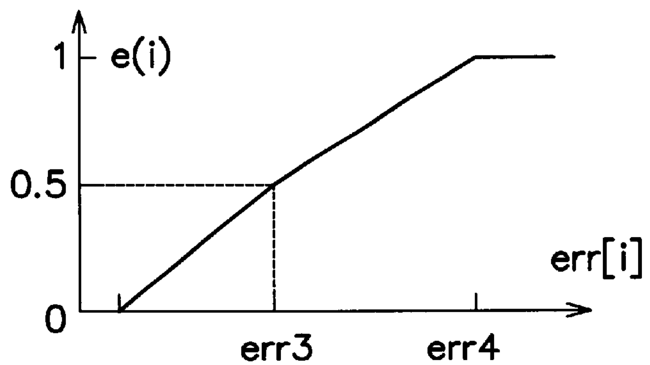

Finally, a membership function such as the one depicted in FIG. 11 is applied to the values of the error functions err[i] to obtain a fuzzy variable e'(i) whose value is indicative of the degree of membership of the values of err[i] to a second fuzzy set "high". In FIG. 11, err3 is a value preferably between 280 and 320, and err4 is a value preferably between 380 and 420.

The value (activation level) r[6] of the seventh fuzzy rule is given by:

$$r[6]=min\{e'(0),\ e'(1),\ e'(2),\ e'(3),\ up(x),\ up(y)\}.$$

The meaning of the values r[k] ($k \in [0;5]$) and r[6] is now discussed.

For each $k \in [0;5]$, the smaller the values of the pair of error functions err[i] and err[j] associated with the pair of predictor motion vectors P[i] and P[j], and the smaller the difference between the two respective motion vectors P[i] and P[j], the higher r[k]; in other words, the activation level r[k] of the corresponding fuzzy rule depends on the sum of absolute luminance difference (SAD) of the pixels of the corresponding blocks in the previous and current source field, but also on the degree of homogeneity of the motion vectors. A higher activation level r[k] signifies a "better fit".

For the seventh fuzzy rule r[6], the higher the values of the four error functions err[i] associated with the four predictor motion vectors, and the higher the magnitude of the predictor motion vectors P[0] and P[1], the higher r[6]. The seventh fuzzy rule has an activation level r[6] which is higher the more the situation is uncertain; i.e. when there is a large movement (P[0] and P[1] high), but none of the four predictor motion vectors seem to provide a good result in terms of their error function when applied to the block K(x,y).

The pair of predictor motion vectors P[i] and P[j] for which the function r[k] ($k \in [0;5]$) has the highest value (i.e. the pair of motion vectors for which the corresponding fuzzy rule has the highest activation level among the first six fuzzy rules) is chosen. Let r[opt] denote the highest value among r[0]–r[5]. Among the two predictor vectors P[i] and P[j] associated with the fuzzy rule having the value r[opt], the one for which the value of the corresponding error function err[i] or err[j] is minimum is called P[min].

A candidate motion vector C is then calculated according to the following algorithm:

if $r[opt]+r[6] \geqq R_{th}$, where $R_{th}$ is a prescribed activation level threshold, then the candidate motion vector C has the following components:

$$Cx = \frac{P[\min]_x \times r[opt]}{r[opt] + r[6]} \qquad (2)$$

$$Cy = \frac{P[\min]_y \times r[opt]}{r[opt] + r[6]}.$$

Thus, the components Cx and Cy of vector C are respectively equal to $P[\min]_x$ and $P[\min]_y$, multiplied by a weighting factor that depends on the activation level of the most activated one of the first six fuzzy rules (r[opt]) and of the seventh fuzzy rule (r[6]). In the particular case of uncertainty as to the choice of the best motion vector indicated by a high value for r[6], the vector 0 is preferred.

Thanks to these weighted components, the value of C depends on the characteristics of the different predictor motion vectors. This means that the components Cx and Cy are determined according to both the homogeneity of the predictor motion vectors and the error between the pairs of corresponding blocks obtained by means of the four predictor motion vectors.

If instead none of the fuzzy rules is sufficiently activated, $r[opt]+r[6]<R_{th}$, then candidate vector C is made equal to the predictor motion vector P[i] for which the associated error function err[i] is the smallest. This means that if the errors err[i] are too high and the vectors are not homogeneous, then the predictor motion vector with the minimum error value is directly chosen as candidate motion vector for block K(x,y), because the weighting of its components is not reliable.

A suitable value for $R_{th}$ has experimentally been determined to be 0.1.

Vector C thus calculated is the candidate motion vector for the block K(x,y) under examination. This vector could be stored in the motion vector matrix MV in the position corresponding to block K(x,y).

However, in order to improve the estimation of the motion of block K(x,y), small perturbations ("updates") are applied to the candidate motion vector C to obtain updated motion vectors. Each updated motion vector indicates two corresponding blocks in the previous and current source fields; the error functions associated to the updated motion vectors are calculated in the manner previously explained in connection with the predictor motion vectors P[i].

First, the following set of four updates is applied to the components Cx and Cy of vector C:

$$\begin{bmatrix}1\\0\end{bmatrix}, \begin{bmatrix}0\\1\end{bmatrix}, \begin{bmatrix}-1\\0\end{bmatrix}, \begin{bmatrix}0\\-1\end{bmatrix}.$$

Four updated vectors Vu[1]–Vu[4] are obtained for C, and for each of these the corresponding error function err is evaluated, in the manner previously described in connection with the predictor motion vectors P[i].

Then, depending on the block K(x,y) under examination, one or the other of the following set of four updates are alternatively applied to the candidate motion vector C:

$$\begin{bmatrix}4\\0\end{bmatrix}, \begin{bmatrix}0\\2\end{bmatrix}, \begin{bmatrix}-4\\0\end{bmatrix}, \begin{bmatrix}0\\-2\end{bmatrix} \text{ or } \begin{bmatrix}10\\0\end{bmatrix}, \begin{bmatrix}0\\4\end{bmatrix}, \begin{bmatrix}-10\\0\end{bmatrix}, \begin{bmatrix}0\\-4\end{bmatrix}.$$

Again, four updated vectors Vu[5]–Vu[8] are obtained for C, and for each, the corresponding error function err is evaluated. In this way, a total of eight new error function values are obtained for each block, each one corresponding to a respective updated vector Vu[1]–Vu[8]. Note also that each update modifies only one of the components Cx or Cy of vector C.

A penalty value is then added to the error function values for the updated vectors, the value of the penalty depending on the value of the update. For this purpose, the components Cx and Cy are examined. If the update is applied to the component of C of greater value, then a first penalty value PEN1 is added to the error function value associated with that updated vector. If the update is applied to the component of C of smaller value, a second penalty value PEN2 is added to the error function value associated with the updated vector, where PEN2>PEN1. Experimentally, it has been found that suitable values for PEN1 and PEN2 are 76 and 228, respectively. In this way, the updated vectors that have a more substantial deviation from the direction of vector C are more penalized with respect to an ultimate choice for a motion vector.

The error functions for the updated vectors, added together with the respective penalty values, form a set of eight errors functions related to eight motion vectors. The updated motion vector providing the smallest penalized error function value is chosen as the motion vector of the block K(x,y) under consideration. Again, this motion vector will correspond to one block in the previous source field and one in the current source field, determined according to equation (1) above.

Up to now, the method for estimating a motion vector for a generic image block has been described. According to one embodiment, all of the image blocks of the intermediate missing image field to be interpolated are submitted to this method, and a motion vector matrix MV is built entirely by estimated motion vectors. According to a preferred embodiment, a suitable way for reducing the number of calculations includes estimating the motion vectors of only a subset of the image blocks of a field. For example, using blocks belonging to either one or the other of the two quincunx patterns Q1 and Q2 depicted in FIG. 5, motion vectors for only half of the image blocks may be estimated according to the method described above. The motion vectors of the remaining image blocks are then interpolated. For the interpolation, median filters are used.

Figure 12:
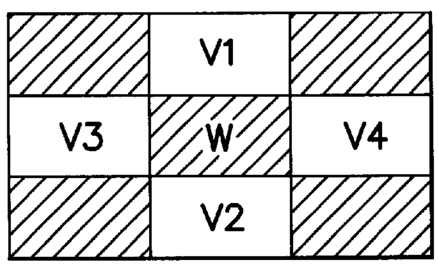
FIG. 12 schematically shows a pattern of motion vectors used to interpolate a motion vector.

With reference to FIG. 12, representing a portion of the motion vector matrix MV, the white squares represent the motion vectors estimated by means of the previously described method, while the shaded blocks represent the motion vectors to be interpolated. For example, one possibly interpolation method for vector W would consider the four adjacent estimated motion vectors V1–V4. For this example, the components Wx and Wy of vector W are interpolated using a median filter given by:

$$Wx = MED\left(\frac{V1x + V2x}{2}, V3x, V4x\right)$$

$$Wy = MED\left(\frac{V1y + V2y}{2}, V3y, V4y\right).$$

Such an interpolation may be performed for each of the image blocks for which no motion vector was estimated. In this manner, the motion vector matrix MV can be completed. For every image block, a corresponding motion vector is thus provided in the matrix, either estimated by means of the previously described method, or interpolated.

The motion vector matrix can be used to interpolate the intermediate missing image field by taking into account the movement of the image blocks as described below. However, to first maximize the uniformity of a motion vector field, (i.e., all the motion vectors of the matrix MV), the following "erosion" process of the motion vector field is performed before actually interpolating the missing image field.

Figure 13:
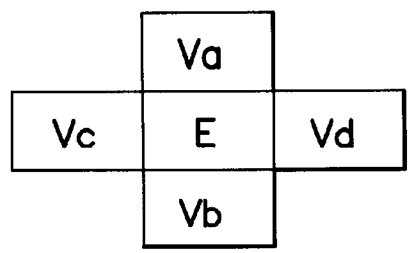
FIGS. 13 and 14 schematically show a pattern of motion vectors used to implement an "erosion" process.
Figure 14:
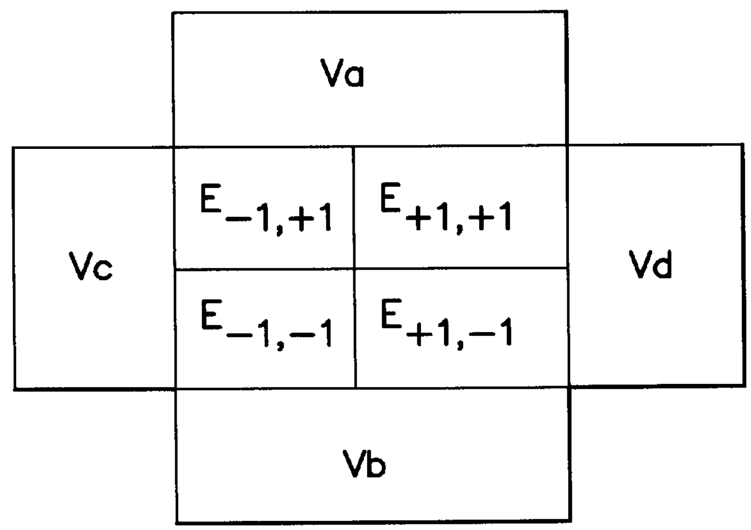

Inside the motion vector matrix MV, patterns of vectors like the one shown in FIG. 13 are selected. Beginning with a vector E in the center of such a pattern, the corresponding image block is divided into four equal sub-blocks. Referring now to FIG. 14, for each sub-block a respective motion vector $\{E_{-1,+1}, \ldots, E_{+1,-1}\}$ is determined by an "erosion" process according to a median filtering performed with vector E and adjacent vectors Va, Vb, Vc, and Vd. This erosion process is in turn iterated for each vector of the starting motion vector matrix MV. In this manner, a new "eroded" vector matrix having four times as many elements is obtained.

As an example of the "erosion" process, the four sub-vectors $\{E_{-1,+1}, \ldots, E_{+1,-1}\}$ are determined as shown in the following table:

| Sub-block | Vector |
|---|---|
| $E_{-1,+1}$ | MED (Va, Vc, E) |
| $E_{+1,+1}$ | MED (Va, Vd, E) |
| $E_{-1,-1}$ | MED (Vb, Vc, E) |
| $E_{+1,-1}$ | MED (Vb, Vd, E) |

The resulting eroded motion vector matrix, having four times more elements than the starting matrix, contains motion vectors that fit well to the motion of the picture.

Applying the motion vectors of the matrix to the different blocks of the missing image field, the corresponding blocks in the previous and current source fields can be determined. For each pixel of the current source field, a motion vector joins the pixel of the current source field to a corresponding pixel of the previous source field.

As discussed earlier, the previous and current source fields contain only half of the lines of an image frame; for example, the previous field may contain only the odd lines and the current field may contain only the even lines. The missing lines of each field can be interpolated in a way similar to that used to interpolate the missing pixels of the blocks, necessary for performing the evaluation of the error functions, also discussed earlier. The previous and current source fields are thus transformed into "progressive" fields, each containing all the lines of an image frame.

To interpolate the pixels of the missing field the following procedure is used.

Figure 15:
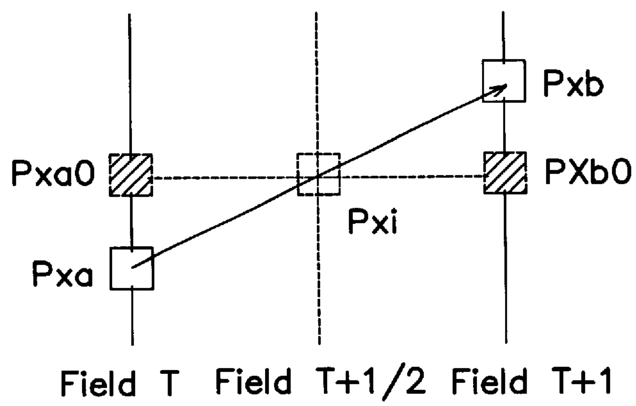
FIG. 15 schematically shows the interpolation of a pixel of a field to be interpolated.

Referring to FIG. 15, to each pixel PXi of the missing field to be interpolated (Field T+½in the figure), the motion vector associated with the image block (more precisely, the image sub-block) to which the pixel Pxi belongs is applied. This motion vector identifies two corresponding pixels belonging to the previous and current source fields, indicated as PXa and PXb, respectively.

The value of pixel PXi can be determined on the basis of the average value of PXa and PXb, namely: Pxi=(PXa+PXb)/2. Better results are obtained however if the following interpolation method is followed. In FIG. 15, the pixels identified in the previous and current source field by a "zero" motion vector crossing the position of pixel PXi are $PXa_0$ and $Pxb_0$. A "zero" motion vector indicates that no motion has occurred for the sub-block containing pixel Pxi from the previous field to the current field. The value of pixel PXi is then determined by performing the following median filtering:

$$PXi = MED\left(\frac{PXa_0 + PXb_0}{2}, PXa, PXb\right).$$

The order in which the source fields are received and how the original source fields and the interpolated intermediate missing fields are output are considered next. Field Rate Up-conversion (FRU) provides for outputting twice as many fields as in the original field-rate. The order of fields after up-conversion is the following:

input field sequence: $O_0$, $E_0$, $O_1$, . . . .

output field sequence: $O_0$, $Ei_{Oo}$, $Oi_{Eo}$, $Ei_{Eo}$, $O_1$, . . .

where:

$O_0$: original odd field containing odd image lines;

$E_0$: original even field containing even image lines;

$Oi_{Eo}$: interpolated odd field containing the odd interpolated lines of the original even field at the time of $E_0$;

$Ei_{Oo}$: interpolated even field containing the even interpolated lines between $O_0$ and $E_0$; and $Ei_{Eo}$: interpolated even field containing the even interpolated lines between $E_0$ and $O_1$.

The original odd fields are output without any change. Fields $Ei_{Oo}$ and $Ei_{Eo}$ are interpolated according to the methods previously described, taking into account the motion of objects between fields $O_0$ and $E_0$, and $E_0$ and $O_1$, respectively.

Figure 16:
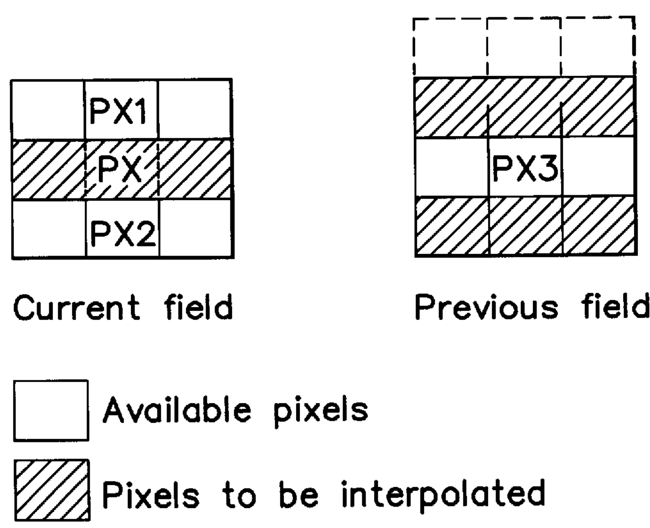
FIG. 16 schematically shows an interpolation process for determining missing pixels in the previous and current fields.

To interpolate the field $Oi_{Eo}$, the motion vector field calculated to estimate motion between fields $O_0$ and $E_0$ is already available, so that the pixels PX of the odd lines missing in field $E_0$ are computed by the three-point median filtering of the pixels PX1, PX2 and PX3, where PX1 and PX2 are the available pixels of the current field $E_0$ surrounding the missing pixel PX, and PX3 is the pixel of the previous field $O_0$ pointed to by the motion vector associated to pixel PX (FIG. 16).

Up to now, it has been assumed that objects move between two adjacent source fields. This is the case when the source image field sequence originates from a television camera (camera mode).

But when the source image field sequence originates from a movie or other types of recorded video sources, motion between two adjacent fields may occur only once over a couple of image frames. This is due to the particular procedure used to encode the movie/video material for broadcasting. Typically, a movie contains 24 pictures per second. For television broadcasting, the 24 pictures per second are converted into 25 image frames per second. In interlaced scanning, each image frame contains two interlaced image fields; as a result, each movie picture is converted into two source image fields that are interlaced. When two image fields originate from the same movie picture, no motion exists between the two fields. Motion only exists between image fields originating from different movie pictures, i.e. once over a couple of image frames.

When no motion exists between two consecutive fields, the derived motion vector matrix will contain only zero vectors. Since the previously described field interpolation method is recursive, problems exist when, for a "next" source field (belonging to the next movie picture), motion is to be estimated; the information of motion estimated two fields previous has been "lost" due to the intervening zero motion vector.

Thus, it is necessary to perform the interpolation of missing fields for up-conversion according to the "type" of source image material. To select the proper motion estimation behavior and the proper sequence of the interpolated fields, a film-mode detector is needed. A film-mode detector according to the present invention is based on accumulating (i.e., summing) the motion vectors of each motion vector matrix, and comparing the accumulated values between two consecutive motion vector matrices.

Assuming that Ap and Ac are the accumulated motion vectors of a previous and current motion vector matrix, respectively, the normal camera mode is indicated when the ratio between Ac and Ap (Ac/Ap) is approximately equal to 1, or the ratio has the same trend (always increasing or always decreasing) when several adjacent frames are considered. No motion is indicated if either Ac or Ap is zero.

A register R is used to store a value related to the Ac/Ap ratio for two consecutive motion vector matrices, namely:

$$R=0 \text{ if } 1-Th \leqq |Ac/Ap| \leqq 1+Th;$$

$$R=1 \text{ if } |Ac/Ap|>1+Th; \text{ and}$$

$$R=2 \text{ if } |Ac/Ap|<1-Th,$$

where Th is a proper threshold value. This value in register R is then compared with the evaluation of a subsequent Ac/Ap ratio corresponding to the next accumulated motion vector, so that the transitional nature of motion between fields of consecutive frames can be determined.

Additionally, current field parity at the point of comparison of R and the subsequent Ac/Ap ratio is considered; the change between two movie pictures (frames) can occur either between a next odd and a previous even field, or between a next even and a previous odd field; i.e. two different film phases (film_mode(phase_0) and film_mode (phase_1)) exist.

To distinguish between camera mode and film mode, the following boolean rules are therefore used:

1) If [1−Th≦|Ac/Ap|≦1+Th] and [R=0] then camera_mode,
2) If [|Ac/Ap|<1−Th] and [R=1] and [current_field_parity=even] then film_mode(phase_0);
3) If [|Ac/Ap|>1+Th] and [R=2] and [current_field_parity=odd] then film_mode(phase_0);
4) If [|Ac/Ap|>1+Th] and [R=2] and [current_field_parity=even] then film_mode(phase_1);
5) If [|Ac/Ap|<1−Th] and [R=1] and [current_field_parity=odd] then film_mode(phase_1);
6) else camera_mode.

If camera mode is detected, the previously described interpolation method is performed.

If film mode is detected, the method of the present invention provides for utilizing the appropriate non-zero motion vector matrices and outputting the following field sequence (here shown by example for the case of film-mode (phase_0), where motion exists between the even field of a source image frame and the odd field of the following source image frame):

input field sequence: $O_0$, $E_0$, $O_1$, . . .

output field sequence: $O_0$, $E_0$, $Oi_{Eo}$, $Ei_{Eo}$, $O_1$, . . .

where:

$O_0$: original odd field (odd image lines);

$E_0$: original even field (even image lines, no motion with respect to $O_0$);

$O_1$: original odd field (odd image lines, following image frame, motion with respect to $E_0$);

$Oi_{Eo}$: interpolated odd field (odd image lines, compensation of motion between $E_0$ and $O_1$); and $Ei_{Eo}$: interpolated even field (even image lines, compensation of motion between $E_0$ and $O_1$).

Figure 17:
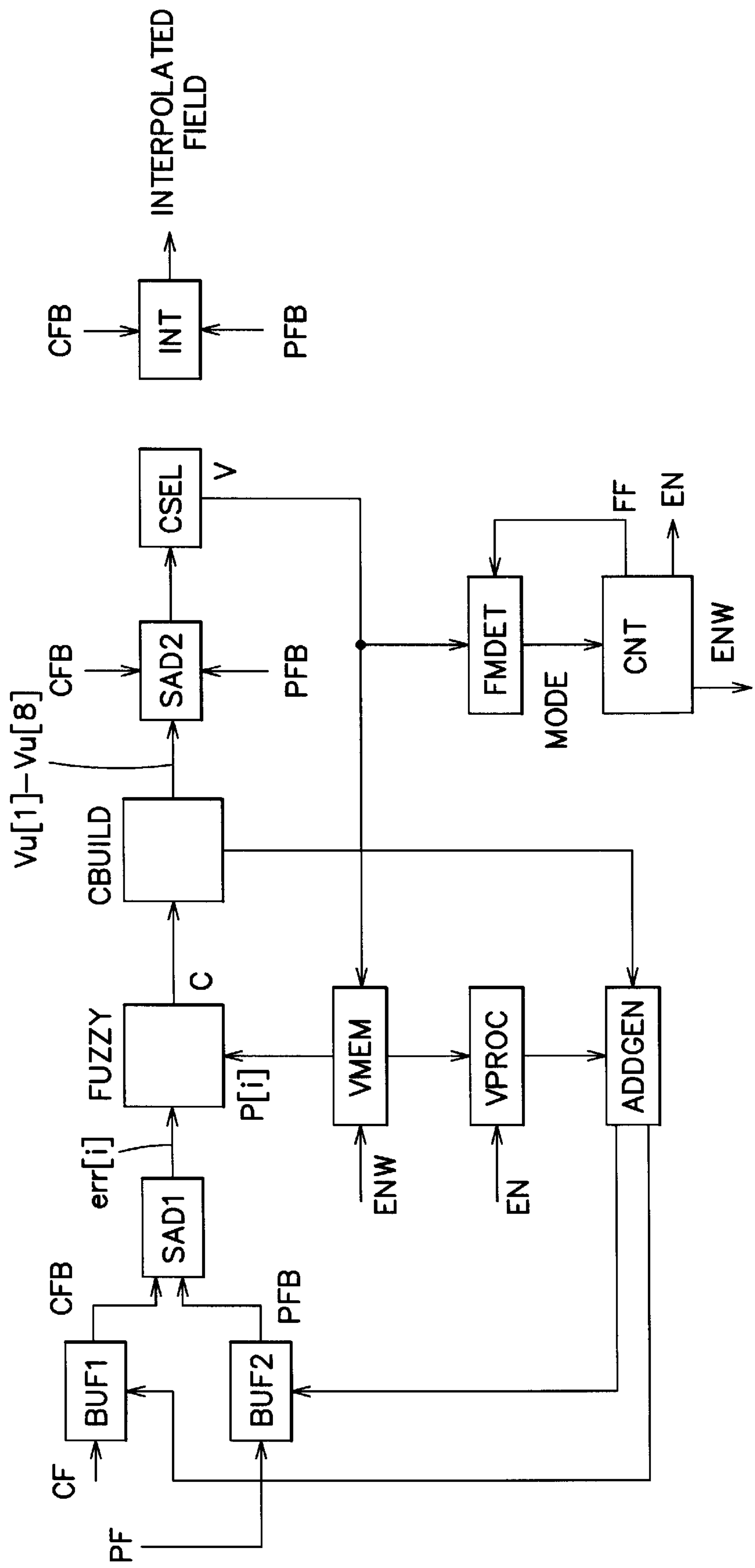
FIG. 17 is a schematic block diagram of a device according to the invention.

A block diagram of a device according to the present invention, suitable for implementing the motion estimated and compensated FRU described above, is depicted in FIG. 17. In the drawing, PF and CF indicate the streams of pixels of the previous and current source image fields, respectively, as received and stored in respective field memories (not shown).

PF and CF are respectively supplied to buffer units BUF1 and BUF2, that create, according to the block-matching technique, portions ("search areas") of the previous and current source image fields.

The outputs PFB and CFB of BUF1 and BUF2, determined by an address generator block ADDGEN that generates addresses for addressing the pixels stored in blocks BUF1 and BUF2, supply a block SAD1. For each generic block K(x,y) (FIG. 6), SAD1 performs the evaluation of the four error functions err[i] (i E [0;3]) associated with the four initially chosen predictor motion vectors P[i] of the four neighboring blocks NB[i]. PFB and CFB also supply another block SAD2, performing the evaluation of the eight error functions err associated to the set of eight updated vectors Vu[1]–Vu[8], calculated by block CBUILD.

Due to the spatial and temporal recursive approach of the method of the present invention, a storage unit VMEM is required to store the previously estimated motion vectors, both belonging to the current and the previous vector matrix.

Blocks SAD1 and VMEM supply a block FUZZY which implements the fuzzy rules previously described, and determines the components of the candidate motion vector C.

The output of block FUZZY (i.e., the candidate motion vector C) supplies block CBUILD which applies to the components of vector C the previously described sets of updates, to determine the eight updated motion vectors Vu[1]–Vu[8].

Block ADDGEN determines the proper source image blocks identified by a selected motion vector; block ADDGEN is supplied by the output of block VPROC and the output of block CBUILD.

The values of the error functions associated to the eight updated motion vectors Vu[1]–Vu[8], evaluated by block SAD2, are supplied to block CSEL, which, according to the algorithm previously described, selects among the eight updated vectors Vu[1]–Vu[8] the motion vector having the smallest associated penalized error function to be associated with the current image block K(x,y) as an estimated motion vector; this vector is then stored in the vector storage unit VMEM. A block VPROC is provided to interpolate the motion vectors for the image blocks not belonging to the chosen quincunx pattern (for which the fuzzy computation is not performed), as described in the preferred embodiment of the invention.

Also, block CSEL supplies a block FMDET, which is able to discriminate between camera mode and film mode according to the algorithm previously described. A control unit CNT is also provided which, in response to the result of the evaluation performed by block FMDET, controls the blocks VMEM and VPROC. Control unit CNT generates two control signals EN and ENW, respectively supplied to blocks VPROC and VMEM. Signal EN is activated when block VPROC has to interpolate a motion vector not belonging to the chosen quincunx pattern, but is deactivated during the motion estimation process; signal ENW is activated to store the motion vector at the output of block CSEL into block VMEM.

Finally, an interpolator block INT, supplied by the outputs PFB and CFB of BUF1 and BUF2, is provided to interpolate the pixels of the missing field according to the estimated or interpolated motion vectors; the estimated or interpolated motion vector, at the output of block VPROC, is supplied to block ADDGEN to determine the addresses of the corresponding pixels in the previous and current fields related by the motion vector. The interpolator block INT then performs the interpolation of the missing pixel according to the median filtering previously described.

In the following discussion, the architecture of the main blocks of the device will be described.

Figure 18:
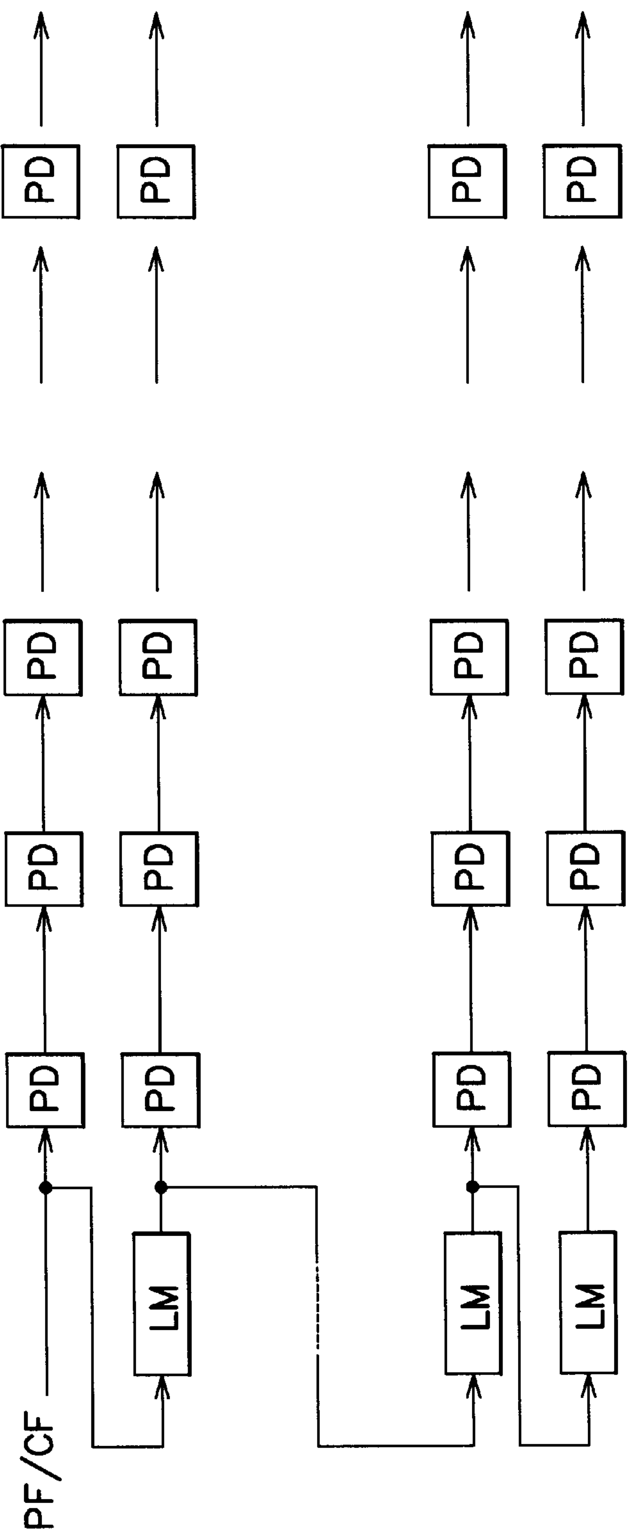
FIGS. 18 to 23 are schematic block diagrams of some blocks of the device of FIG. 17.

Blocks BUF1 and BUF2 have the same structure, depicted in FIG. 18. The purpose of these two blocks is to store part of the image pixels of the previous and current source fields in order to implement a search area in both source fields. The search area dimension is larger than the blocks used to compute the match, and its dimension determines the magnitude of the maximum motion vector that can be estimated.

Basically, each block BUF1 and BUF2 includes a plurality of line memories LM that store the image lines of the search area, and pixel delays PD. The number of line memories LM affects the maximum vertical component of the motion vector that can be estimated; the number of pixel delays PD affects the maximum horizontal component of the estimated motion vector.

Figure 19:
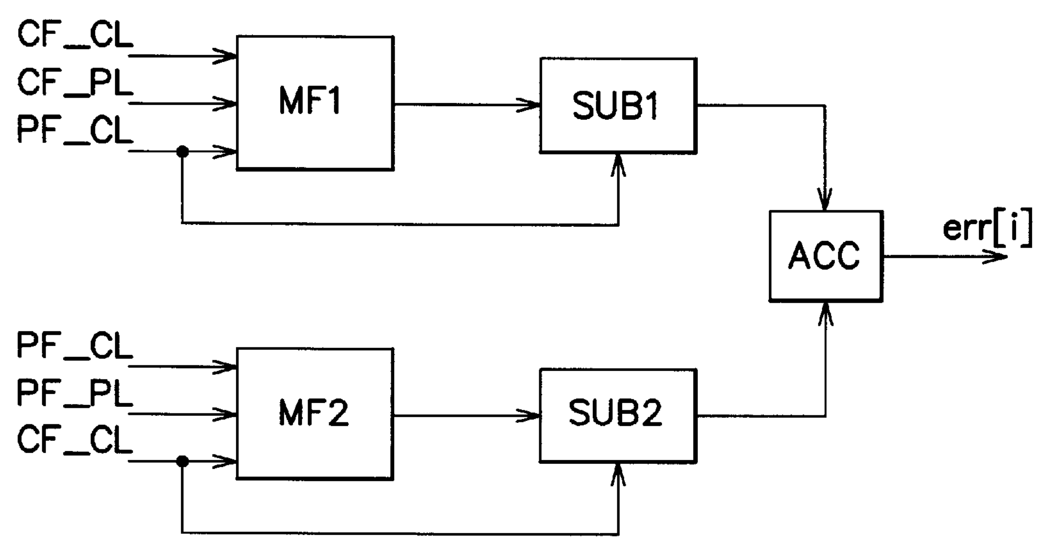

FIG. 19 shows one of four identical units that constitute block SAD1. For each generic image block K(x,y) for which a motion vector is estimated, block SAD1 evaluates the four error functions err[i] associated to the four predictor motion vectors P[i]. Each vector P[i] identifies two corresponding image blocks in the previous and current source fields, respectively. In order to evaluate the matching degree of the two blocks identified by the motion vector P[i], the associated error function err[i] is evaluated. To perform the evaluations, the corresponding image blocks in the previous and current source fields are transformed into progressive format, to include all the image lines.

This transformation is accomplished by blocks MF1 and MF2, which perform a median filtering to interpolate the missing pixels in each block (according to the algorithm previously described in connection with FIG. 7). In the drawing:

CF_CL: current field, current line;

CF_PL: current field, previous line;

PF_CL: previous field, current line; and

PF_PL: previous field, previous line.

The outputs of the median filters, together with PF_CL or, respectively, CF_CL, are supplied to a respective subtractor block SUB1 or SUB2, that performs the absolute difference of the luminance value of the pixels in the corresponding blocks. The outputs of the two subtractors are then stored in an accumulator block ACC.

To better understand the architecture of block SAD1, an example of a source image block transformed into progressive format is considered, having a final dimension of 8*8=64 pixels.

This implies that to transform the block into progressive format, 32 out of the 64 pixels (4 image lines) must have been interpolated for each image block. To compute the error function err between two corresponding image blocks in the previous and current fields, 64 median filters and 64 subtractors are therefore required. The accumulator block ACC provides the cumulative error err[i]. Since block SAD1 has to calculate the error functions err[i] related to the four predictor motion vectors P[i], it should contain four units equal to that shown in FIG. 19.

Figure 20:
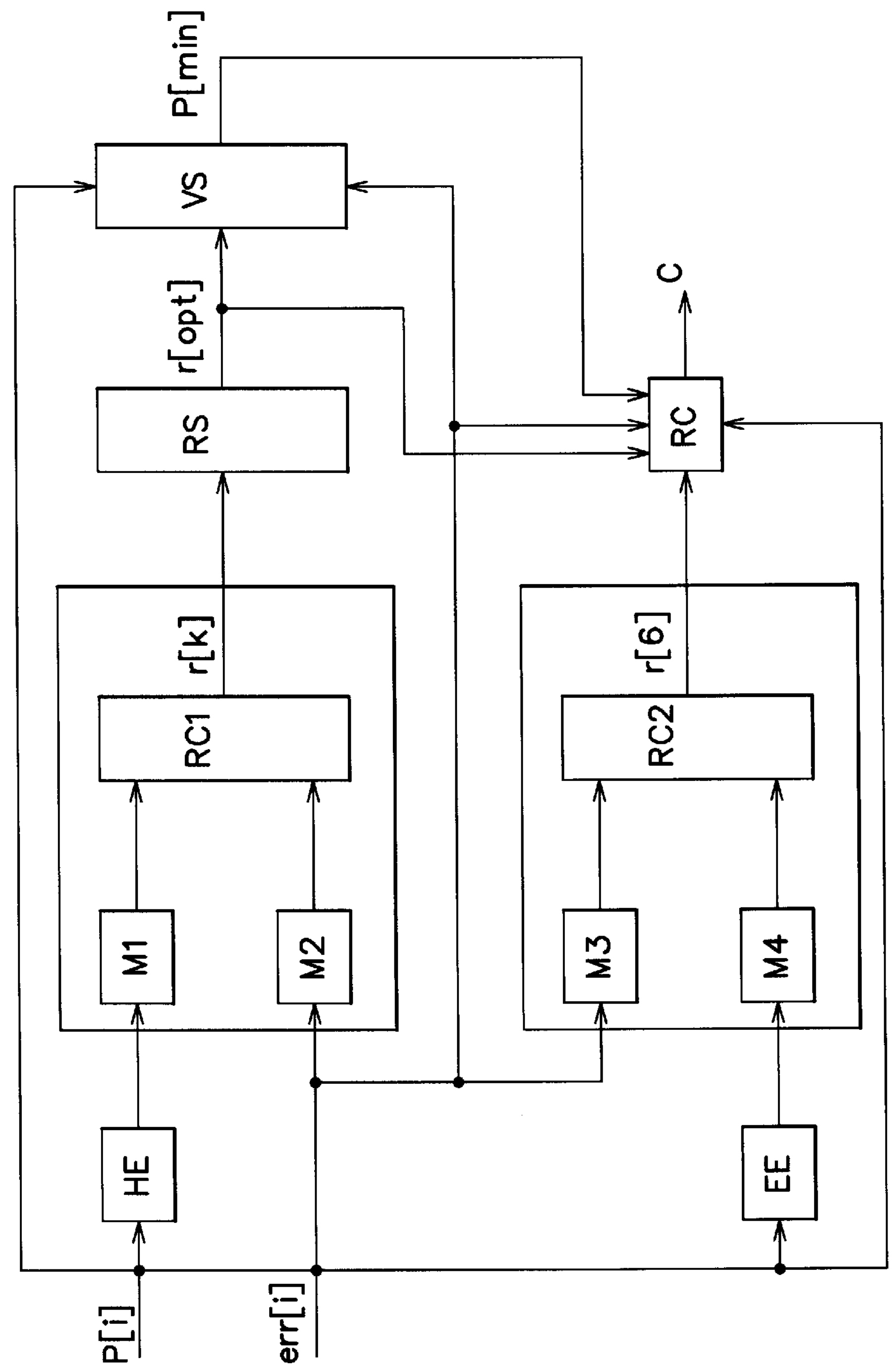

The inner architecture of block FUZZY is shown in FIG. 20. Depending on the outcome of rules based on the homogeneity of the four predictor motion vectors P[i] and on the associated error functions err[i], a fuzzy process will create the candidate motion vector C.

The fuzzy process basically includes two parts. The first part is formed by blocks M1, M2, and RC1. This first part determines fuzzy rule activation levels r[k] (the result of the first six fuzzy rules previously described) based on the degree of homogeneity and on the respective error functions err[i] of the four predictor motion vectors P[i]. The variables r[k] are subsequently used to select the "best" predictor vector from among the four (P[min]). The second part of the fuzzy process is formed by blocks M3, M4, and RC2 and implements a sort of "fall-back" fuzzy rule (the seventh fuzzy rule previously described); if all of the predictor vectors P[i] have associated high error functions err[i] and the predictor vectors themselves indicate large movement (extent), a zero motion vector is selected.

More particularly, block M1 implements the membership function shown in FIG. 8 (on the basis of the values H(i,j) calculated by homogeneity evaluator block HE), M2 implements the membership functions shown in FIG. 9, and block RC1 evaluates the activation levels r[k] (k=0–5) of the first six fuzzy rules previously described; the output of block RC1 is therefore the six activation levels r[k]. Block M3 implements the membership function depicted in FIG. 11, M4 implements the membership functions depicted in FIG. 10 (one for the two components UP(x) and UP(y) calculated by extent evaluator block EE), and block RC2 evaluates the activation level r[6] of the seventh fuzzy rule; the output of block RC2 is therefore the activation level r[6].

As shown in FIG. 7, the four predictor vectors P[i] are provided to block FUZZY by block VMEM; the values of the four error functions err[i] are provided by block SAD1.

In FIG. 20, the output r[k] (k=0–5) of block RC1 is supplied to a block RS (Rule Selector) which selects the result of the first six fuzzy rules having the highest activation level (r[opt]). As previously described, two of the four predictor motion vectors, P[i] and P[j], are associated with each one of the first six fuzzy rules. Once r[opt] has been determined, the predictor motion vector having the minimum error function between the two predictor vectors associated with r[opt] is selected by block VS (Vector Selector). This vector P[min] ("best predictor") is supplied, together with the value r[opt] provided by block RS and the value r[6] provided by block RC2, to a block RC (Rule Composition) that calculates the components $C_x$ and $C_y$ of the candidate motion vector C according to the formula (2) previously described. Block RC is also supplied by the values err[i] and by the four predictor vectors P[i]; as previously described, when none of the seven fuzzy rules has a sufficiently high activation level, the predictor vector having the smallest error function is chosen as vector C.

Figure 21:
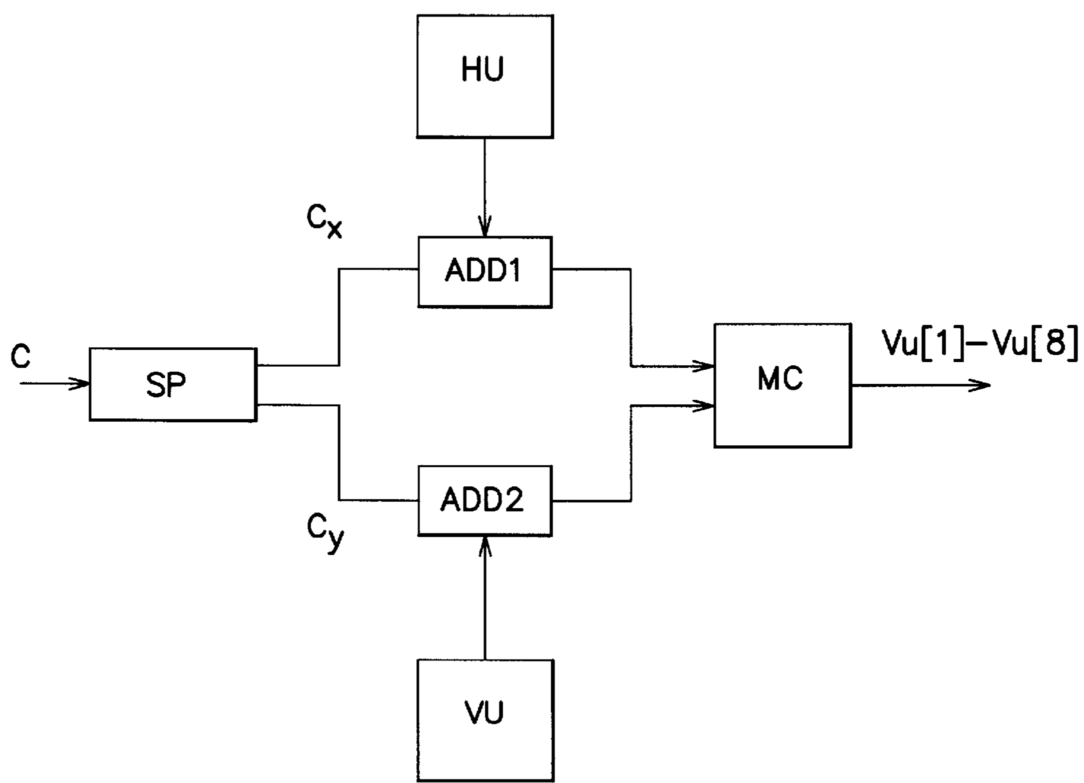

The structure of block CBUILD is depicted in FIG. 21. This block is supplied by vector C, and determines the eight updated vectors Vu[1]–Vu[8]. Block SP splits vector C into its components Cx and Cy, respectively along the X and Y axes. Block HU provides the horizontal components of the sets of updates, which are applied to Cx; similarly, block VU provides the vertical components of the sets of updates, which are applied to Cy. Block MC merges the horizontal and vertical components Vu[n]x, Vu[n]y (n=1–8) of the updated vectors. The inner structure of blocks SP and MC depends on the particular data structure used to present the motion vectors.

The eight updated vectors Vu[1]–Vu[8] are supplied to block SAD2, which is composed eight units identical to that shown in FIG. 19.

Block CSEL adds to the eight error functions calculated by block SAD2 the appropriate penalty values PEN1 and PEN2. Block CSEL then compares the eight penalized error function values to determine the minimum error function value and the associated updated motion vector from Vu[1]–Vu[8]. The updated vector with the minimum error function value is selected as estimated motion vector for the block K(x,y) under examination.

Basically, block CSEL includes adders (to add the penalty to the error functions associated to the eight updated vectors, calculated by block SAD2) and a block suitable of evaluating the minimum among eight elements.

Figure 22:
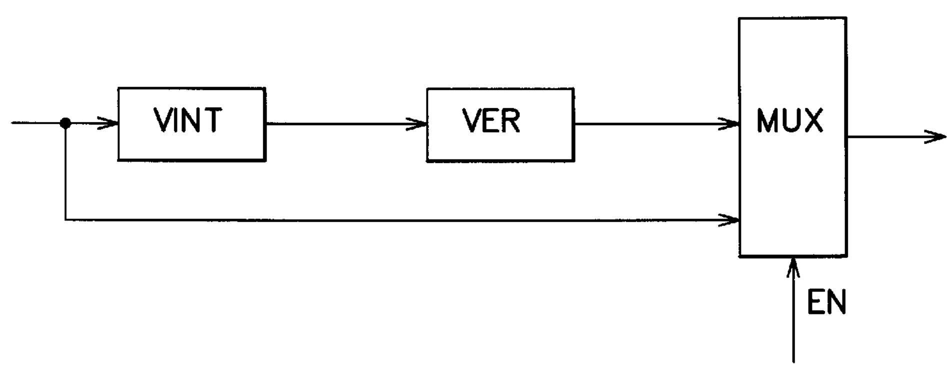

The structure of block VPROC is shown if FIG. 22. As previously stated, in a preferred embodiment of the present invention, the motion vector field is estimated for a quincunx sub-sampled pattern of blocks. The "missing" motion vectors have to be interpolated. Block VPROC includes a block VINT performing the interpolation previously described in connection with FIG. 12 for obtaining the missing motion vectors. Block VPROC also includes a block VER performing the "erosion" process previously described in connection with FIGS. 13 and 14. Block VINT is supplied by the output of block VMEM; the output of block VER supplies a multiplexer block MUX that is also supplied directly by the output of block VMEM. Control signal EN provided by block CNT selects the behavior of block VPROC, which must be active during the interpolation of the output vector field and not during the motion estimation process.

Figure 23:
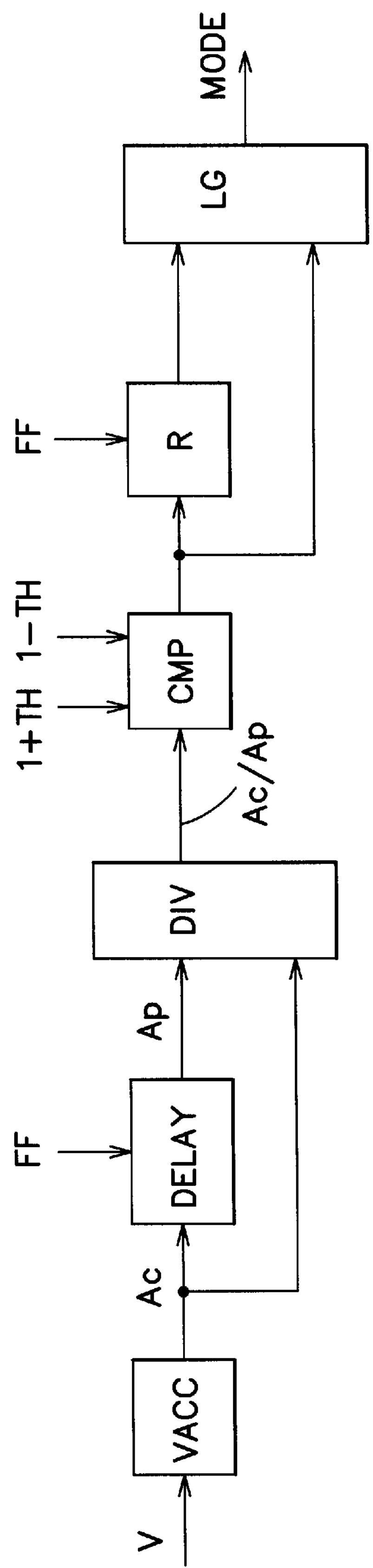

Block FMDET has the structure shown in FIG. 23. The input V of block FMDET represents the current motion vector, provided at the output of block CSEL; this vector is accumulated by block VACC with the other motion vectors relating to the same image field; at the output of block VACC the value Ac is obtained. FF is a 100 Hz clock signal corresponding to the output field frequency, and supplies a register DELAY used to store the accumulated motion vector field relating to the image field. The register DELAY outputs the accumulated value at the time of the following field; the output of register DELAY is Ap.

A divider block DIV computes the ratio $|Ac/Ap|$, while a comparator block CMP determines which condition is satisfied (i.e $|Ac/Ap|\cong 1$, $|Ac/Ap|>1+Th$, or $|Ac/Ap|<1-Th$). The result of this comparison is stored in a register R. A block LG implements the boolean rules 1–6 previously described for selection of camera mode or film mode.

The output MODE (MODE=camera_mode, MODE=film_mode(phase0), MODE=film_mode(phase1)) of block LG is supplied to block CNT so that the proper control signals EN or ENW can be respectively generated when motion estimated or compensated field interpolation is to be performed.

Block INT implements the required computation to interpolate the pixels of the missing field. Basically, it is composed by an adder and a median filter.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only, and it is not intended as limiting. The invention's limit is defined only in the following claims and the equivalent thereto.

What is claimed is:

1. A method for motion estimated and compensated field rate up-conversion for video applications, comprising steps of:

dividing an intermediate image field to be interpolated into a plurality of image blocks, each image block made up of a set of image elements of the intermediate image field;

selecting a group of neighboring image blocks for each image block from a subset of the plurality of image blocks;

determining an estimated motion vector for each image block based on a plurality of predictor motion vectors associated with the group of neighboring image blocks, each estimated motion vector describing a movement of each image block from a previous image field to a current image field, including the steps of:

applying to each image block each of the predictor motion vectors to determine a pair of corresponding image blocks in the previous and current image fields;

evaluating an error function which is the Sum of luminance Absolute Difference between corresponding image elements in the pair of corresponding image blocks for each predictor motion vector;

grouping the plurality of predictor motion vectors into a plurality of pairs of predictor motion vectors;

evaluating a degree of homogeneity for each pair of predictor motion vectors;

applying a fuzzy rule for each pair of predictor motion vectors, the fuzzy rule having an activation level that is proportional to the degree of homogeneity and inversely proportional to the error functions associated with each predictor motion vector of the pair of predictor motion vectors;

determining an optimum fuzzy rule having the highest activation level;

determining a best predictor motion vector of the pair of predictor motion vectors associated with the optimum fuzzy rule, the best predictor motion vector having the smaller error function; and selecting the estimated motion vector for each image block based on the best predictor motion vector; and determining each image element of each image block by interpolation of two corresponding image elements in the previous and current image fields related by the estimated motion vector to generate the intermediate image field.

2. The method according to claim 1, wherein the group of neighboring image blocks includes:

a first sub-group of image blocks preceding each image block in a scanning sequence of the subset of image blocks; and a second sub-group of image blocks following each image block in the scanning sequence.

3. The method according to claim 2, wherein the group of neighboring image blocks includes four image blocks nearest to each image block in the diagonal directions.

4. The method according to claim 3, wherein the step of evaluating a degree of homogeneity includes computing a sum of absolute differences between respective first and second components of each predictor motion vector of each pair of predictor motion vectors, the first and second components respectively parallel to two orthogonal axes.

5. The method according to claim 4, wherein the step of applying a fuzzy rule includes:

determining a fuzzy set small for the values of the error functions;

determining a first degree of membership of each of the error functions to the fuzzy set small;

determining a first fuzzy set high for the degree of homogeneity; and determining a second degree of membership of the degree of homogeneity to the fuzzy set high.

6. The method according to claim 5, wherein the step of applying a fuzzy rule further includes evaluating the activation level of the fuzzy rule by determining the minimum among the second degree of membership and each of the first degrees of membership.

7. The method according to claim 6, wherein the step of selecting the estimated motion vector includes choosing the best predictor motion vector as the estimated motion vector.

8. The method according to claim 6, wherein the step of determining an estimated motion vector further includes steps of:

applying a further fuzzy rule having a further activation level which is proportional to the error functions and the predictor motion vectors; and selecting a candidate estimated motion vector as a weighted average between the best predictor motion vector and a zero vector, the weighted average including the activation level and the further activation level.

9. The method according to claim 8, wherein the step of applying a further fuzzy rule includes:

determining a first value and a second value that are each a sum of the first and second components, respectively, of the two predictor motion vectors associated with the first sub-group of image blocks;

determining a second fuzzy set high for the first and second values;

determining respective degrees of membership of the first and second values to the second fuzzy set high;

determining a third fuzzy set high for the values of the error functions; and determining respective degrees of membership of the error functions to the third fuzzy set high.

10. The method according to claim 9, wherein the step of applying a further fuzzy rule includes the step of evaluating the further fuzzy activation level by determining the minimum among the degrees of membership to the second fuzzy set high and the degrees of membership of the error functions to the third fuzzy set high.

11. The method according to claim 10, wherein the step of selecting the estimated motion vector includes choosing the candidate estimated motion vector as the estimated motion vector.

12. The method according to claim 10, wherein the step of determining an estimated motion vector includes:

applying a set of updates to the candidate estimated motion vector to obtain a corresponding set of updated motion vectors; and evaluating the error functions associated with the set of updated motion vectors.

13. The method according to claim 12, further including the step of selecting the updated motion vector having the minimum error function as the estimated motion vector.

14. The method according to claim 12, wherein the step of evaluating the error functions further includes the step of adding respective penalty values to the error functions associated with the updated motion vectors, the penalty values depending on a difference in direction between the updated motion vectors and the candidate estimated motion vector.

15. The method according to claim 1, wherein the subset of the plurality of image blocks includes image blocks belonging to either one or the other of two complementary quincunx patterns.

16. The method according to claim 15, wherein:

the step of determining an estimated motion vector for each image block only determines the estimated motion vector for each image block in the subset;

the method further includes the step of determining an interpolated motion vector for each image block not belonging to the subset by interpolating the estimated motion vectors of respective neighboring image blocks belonging to the subset; and the step of determining each image element of each image block interpolates two corresponding image elements in the previous and current image fields related by one of the estimated motion vector and the interpolated motion vector to generate the intermediate image field.

17. The method according to claim 16, further including the steps of:

dividing each image block into four sub-blocks; and calculating a motion vector for each sub-block as an average between the estimated or interpolated motion vector for the image block and the estimated or interpolated motion vectors associated with respective neighboring image blocks.

18. The method according to claim 1, wherein the step of evaluating an error function further includes the step of transforming the pair of corresponding image blocks into progressive format.

19. A method for motion estimated and compensated field rate up-conversion for video applications, comprising steps of:

determining if a received image field sequence originates from a video camera or a movie;

grouping the received image field sequence into a plurality of pairs of received image fields, each pair including a previous image field and a current image field;

if the received image field sequence originates from the video camera, performing the method according to claim 16 to generate the intermediate image field for each pair of received image fields; and if the received image field sequence originates from the movie, performing the method according to claim 16 to generate the intermediate image field for alternate pairs of received image fields, wherein the previous image field and the current image field each originate from different image frames.

20. The method according to claim 19, wherein the step of determining if the received image field sequence originates from a video camera or a movie includes steps of:

evaluating a plurality of accumulated values corresponding to a plurality of intermediate image fields, each accumulated value associated with the estimated and interpolated motion vectors of a respective intermediate image field;

evaluating a first ratio of a first group of two consecutive accumulated values;

storing a first value corresponding to the first ratio;

evaluating a second ratio of a second group of two consecutive accumulated values, the second group immediately following the first group; and determining if the received field sequence originates from the video camera or the movie based on the first value, the second ratio and a parity of the current image field.

21. An apparatus for motion estimated and compensated field rate up-conversion for video applications, comprising:

image element storage means for storing image elements of a previous and a current image field and for creating a search area in the previous and current image fields;

addressing means for addressing selected image elements in the image element storage means;

motion vector storage means for storing a plurality of motion vectors that relate the previous image field to the current image field;

first computation means supplied by the storage means for evaluating a plurality of error functions associated with a corresponding plurality of predictor motion vectors;

a fuzzy computation unit supplied by the first computation means and the motion vector storage means for determining a best predictor motion vector; and interpolation means supplied by the storage means for determining each image element of an intermediate image block by interpolation of two corresponding image elements in the previous and current image fields related by the motion vector;

wherein the fuzzy computation unit includes:

a homogeneity evaluator for evaluating the degree of homogeneity of each pair of the predictor motion vectors;

a first membership evaluator supplied by the degree of homogeneity for determining a degree of membership of the degree of homogeneity to a first fuzzy set high;

a second membership evaluator supplied by the error functions for determining a degree of membership of the error functions to a fuzzy set small;

a first rule computation unit supplied by the first and second membership evaluators for determining an activation level of a plurality of fuzzy rules;

a rule selector supplied by the first rule computation unit for determining the fuzzy rule having the highest activation level; and a vector selector supplied by the rule selector and the predictor motion vectors for determining the best predictor motion vector.

22. The device according to claim 21, wherein the fuzzy computation unit further includes:

a third membership evaluator supplied with the error function values for determining a degree of membership of the error function values to a second fuzzy set high;

an extension evaluator supplied with the predictor motion vectors for determining a first extension value and a second extension value providing a measure of extension of the predictor motion vectors respectively along two coordinate axes;

a fourth membership evaluator for determining a degree of membership of the first and second values to the third fuzzy set high;

a second rule computation unit supplied by the third and fourth membership evaluators for determining a further activation level of a further fuzzy rule; and a rule composition unit supplied by the rule selector, the vector selector and the second rule computation unit for determining a candidate estimated motion vector.

23. The device according to claim 22, further comprising:

a vector updating block supplied by the fuzzy computation unit for applying to the candidate estimated motion vector a set of updates for obtaining updated motion vectors;

second computation means for evaluating error functions associated with the updated motion vectors; and a candidate selector supplied by the second computation unit for determining the updated motion vector having the minimum associated error function.

24. The device according to claim 23, wherein the vector updating block includes:

a vector component splitter for determining the components along the coordinate axes of the candidate estimated motion vector;

a first and a second adder for respectively adding to each component of the candidate estimated motion vector a respective update value; and a vector component merger for merging together the components.

25. An apparatus for motion estimated and compensated field rate up-conversion for video applications, comprising:

image element storage means for storing image elements of a previous and a current image field and for creating a search area in the previous and current image fields;

addressing means for addressing selected image elements in the image element storage means;

motion vector storage means for storing a plurality of motion vectors that relate the previous image field to the current image field;

first computation means supplied by the storage means for evaluating a plurality of error functions associated with a corresponding plurality of predictor motion vectors;

a fuzzy computation unit supplied by the first computation means and the motion vector storage means for determining a best predictor motion vector; and interpolation means supplied by the storage means for determining each image element of an intermediate image block by interpolation of two corresponding image elements in the previous and current image fields related by the motion vector;

further comprising detector means for detecting if a received image field sequence originates from a video camera or a movie;

wherein the detector means includes:

a vector accumulation means for calculating a current accumulated value of the estimated motion vectors;

a first register for storing a previous accumulated value of the estimated motion vectors;

a divider means for evaluating a current ratio between the current accumulated value and the previous accumulated value;

a second register for storing the value of a previous ratio associated to the three previous received image fields preceding the current image field; and means for determining if the received field sequence originates from a movie on the basis of the value of the current ratio, the value of the previous ratio and a parity of the current image field.

26. A method for interpolating an intermediate image from a previous image and a current image of a video source, comprising steps of:

dividing the intermediate image into a plurality of image blocks, each image block including a plurality of image elements;

dividing the plurality of image blocks into a plurality of groups, wherein the image blocks constituting each group do not have common perimeters;

estimating a plurality of motion vectors, wherein:

each motion vector corresponds to an associated image block of the plurality of image blocks; and each motion vector is estimated using image blocks from the group containing the associated image block;

applying each motion vector to each image element of the associated image block to obtain a pair of corresponding elements, a first element of the pair included in the previous image and a second element of the pair included in the current image; and interpolating each image element from the pair of corresponding elements;

wherein the step of estimating a plurality of motion vectors includes steps of:

applying a plurality of predictor motion vectors to the associated image block to generate a pair of source image blocks for each predictor motion vector, a first of the pair of source image blocks included in the previous image, a second of the pair of source image blocks included in the current image, each predictor motion vector associated with a neighbor image block from the group containing the associated image block;

evaluating a respective error function for each predictor motion vector, based on a comparison of the first and the second of the pair of source image blocks;

evaluating a plurality of fuzzy rules based on the plurality of predictor motion vectors and the respective error function for each predictor motion vector to obtain a minimum predictor motion vector; and estimating each motion vector by either the minimum predictor motion vector or the predictor motion vector having the smallest respective error function, based on the plurality of fuzzy rules.

27. The method of claim 26, wherein the neighbor image block is located proximate the associated image block in a diagonal direction.

* * * * *

UNITED STATES PATENT AND TRADEMARK OFFICE
CERTIFICATE OF CORRECTION

PATENT NO. : 6,240,211 B1
DATED : May 29, 2001
INVENTOR(S) : Massimo Mancuso, Viviana D'Alto, Rinaldo Poluzzi, Luca Molinari It is certified that error appears in the above-identified patent and that said Letters Patent is hereby corrected as shown below:

Title page, Item [56] should include:

| Country & Doc. No. | Pub Date [43] | | class | sub class |
|---|---|---|---|---|
| EP-A-0 650 293 | 04/26/95 | Seleco S.p.A. | H04N | 5/44 |
| EP-A-0 684 726 | 11/29/95 | Co.Ri.M.Me. Consorzio per La Ricerca | H04N | 1/00 |

European Search Report from European Patent Application 97830188.5, filed April 24, 1997

Koivunen T., et al., "Motion Estimation Using Combined Shape And Edge Matching" Signal Processing: Image Communication, June 1994, Netherlands, vol. 6, no.3, pp 241-252

Brubaker D. I., "Fuzzy-Logic System Solves Control Problem" EDN, June 18, 1992, USA, vol.37, no. 13, pp 121-126

Column 8,
Lines 4-10, equation [2] should read as follows:

$$C\chi = \frac{P[\min]_{\chi}\ \chi\ r[opt]}{r[opt] + r[6]}$$

(2)

$$C\chi = \frac{P[\min]_{y}\ \chi\ r[opt]}{r[opt] + r[6]}$$

Signed and Sealed this

Fourth Day of December, 2001

*Attest:*

Nicholas P. Godici

NICHOLAS P. GODICI

*Attesting Officer* *Acting Director of the United States Patent and Trademark Office*